(12) United States Patent
Qiu et al.

(10) Patent No.: US 12,314,034 B2
(45) Date of Patent: May 27, 2025

(54) METHOD FOR MANAGING MANAGEMENT BOARD OF IMMERSION COOLING TANK, MANAGEMENT BOARD OF IMMERSION COOLING TANK, IMMERSION COOLING TANK, AND NON-TRANSITORY STORAGE MEDIUM

(71) Applicant: Fulian Precision Electronics (Tianjin) Co., LTD., Tianjin (CN)

(72) Inventors: Duo Qiu, Tianjin (CN); Li-Quan He, Tianjin (CN); Wei-Chen Lin, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 442 days.

(21) Appl. No.: 18/072,549

(22) Filed: Nov. 30, 2022

(65) Prior Publication Data

US 2023/0350386 A1   Nov. 2, 2023

(30) Foreign Application Priority Data

Apr. 28, 2022 (CN) .......................... 202210470927.6

(51) Int. Cl.
   *G05B 19/4155*   (2006.01)
(52) U.S. Cl.
   CPC .................. *G05B 19/4155* (2013.01); *G05B 2219/50333* (2013.01)

(58) Field of Classification Search
   CPC ...... G05B 19/4155; G05B 2219/50333; G06F 1/206; G06F 13/4286; H02J 13/00002; H02J 13/00028; H02J 13/00032
   See application file for complete search history.

(56) References Cited

U.S. PATENT DOCUMENTS

2019/0037723 A1 *   1/2019   Vatariu ................ H05K 7/1447

FOREIGN PATENT DOCUMENTS

CN              113867514 A   * 12/2021

* cited by examiner

*Primary Examiner* — Chad G Erdman
(74) *Attorney, Agent, or Firm* — ScienBiziP, P.C.

(57) ABSTRACT

A method for managing a management board of an immersion cooling tank detects a signal of each of the first terminals of the management board. The method determines a first number of levels of the detected signals being high and a second number of the levels of the detected signals being low. The method further determines whether the management board is the master management board or is the slave management board according to the first number and the second number. The management board is determined to be the master management board if the levels of all of the detected signals are low. A related management board of an immersion cooling tank and a non-transitory storage medium are also provided.

20 Claims, 9 Drawing Sheets

METHOD FOR MANAGING MANAGEMENT BOARD OF IMMERSION COOLING TANK, MANAGEMENT BOARD OF IMMERSION COOLING TANK, IMMERSION COOLING TANK, AND NON-TRANSITORY STORAGE MEDIUM

FIELD

The subject matter herein generally relates to power management technology, and particularly to a method for managing a management board of an immersion cooling tank, a management board of an immersion cooling tank, an immersion cooling tank, and a non-transitory storage medium.

BACKGROUND

As data centers develop, a power density per cabinet in the data center is becoming greater. An air cooling system alone may not satisfy cooling demands of the data center. Therefore, liquid cooling systems are becoming the dominant cooling systems in date centers. An immersion cooling system is a liquid cooling system. Servers are directly submerged in a cooling liquid and are sealed in the tank. Heat from the server is removed by circulating cooling liquid. The concept of immersion cooling is by direct contact of heat transfer, which has a higher cooling effect, a low noise level compared with the air cooling and the other liquid cooling, such as a cold plate and a spray liquid cooling.

The immersion cooling system is centrally powered by a power system. Referring to FIG. 1, the tank 110 of the immersion cooling system can include a number of power shelves 111. Each power shelf 111 can support a number of power supply units 112 (hereinafter PSU 112). Each PSU 112 can convert alternating current voltage of the mains provided by an external power distribution system 120 to a low-voltage direct current voltage, and provide the low-voltage direct current voltage to a number of loads 113 in the tank 110. Each power shelf 111 can correspond to a power management controller 114 (hereinafter PMC 114). Each PMC 114 can include a baseboard management controller 115 (hereinafter BMC 115). Each PMC 114 can be configured to monitor operations of the PSUs 112, and transmit the operations of the monitored PSUs 112 to a remote management platform 130 which is external to the tank 110 via a number of exchangers 116 in the tank 110. Thus, an out of band management is achieved. However, the PMC 114 needs to separately transmit the operations of the PUSs to the remote management platform 130, thus a power distribution requirement of an entire tank 110 can be not balanced, and a complexity of the out of band management is increased.

SUMMARY

An embodiment of the present application provides a method for managing a management board of an immersion cooling tank, a management board of the immersion cooling tank, the immersion cooling tank, and a non-transitory storage medium, which balances a power distribution requirement of an entire tank, and reduces complexity of an out of band management process.

In a first aspect, an embodiment of the present application provides a method for managing a management board of an immersion cooling tank. The method is applied on the management board of the immersion cooling tank. The immersion cooling tank includes a number of power shelves and a number of management boards. Each power shelf corresponds to one management board. Each management board is configured to manage a number of operations of a number of PSUs in a power shelf. Each management board includes at least two first terminals. Each first terminal is configured to enable a communication between the management board and one other management board. The management boards includes one or more master management boards and two or more slave management boards. Each first terminal of each master management board is configured to couple to one first terminal of one slave management board. One first terminal of one master management board is coupled to one first terminal of one slave management board via an RJ45 connector when the one first terminal of the one master management board is coupled to the one first terminal of the one slave management board. The method detects a signal of each first terminal of the management board. The method further determines a first number of levels of the detected signals being high and a second number of levels of the detected signals being low. The method further determines whether the management board is the master management board or the slave management board according to the first number and the second number. Wherein, the management board is determined to be the master management board if the levels of all of the detected signals are low.

According to some embodiments of the present application, the detecting of the signal of each first terminal of the management board includes, detecting a signal of a pin 2 of each first terminal of the management board to detect the signal of each first terminal of the management board. Wherein, a high level signal is applied to the pin 2 of each first terminal of the management board via a pull-up resistor, and a low level signal is applied to a pin 6 of each first terminal of the management board via a pull-down resistor. The pin 2 of each first terminal of each management board is coupled to the pin 6 of one first terminal of the other management board when each first terminal of the management board is coupled to the one first terminal of the other management board.

According to some embodiments of the present application, the method further obtains a number of operation data of the power supply units in the power shelves corresponding to the slave management boards coupled to the master management board from the slave management boards coupled to the master management board via an RS232 protocol, if the management board is the master management board. The method further gathers the operation data of the power supply units in the power shelves corresponding to the slave management boards and monitored operation data of the power supply units in the power shelf corresponding to the master management board.

According to some embodiments of the present application, the method further determines that the management board is the slave management board if the level of one of the detected signals is low and the levels of the other of the detected signals are high.

According to some embodiments of the present application, the method further detects a state of a second terminal of the management board if the levels of all of the detected signals are high; and determines that the management board is the master management board if the state of the second terminal of the management board is in a normal communication state.

According to some embodiments of the present application, the method further transmits log information of at least one of the first terminals which have no cable inserted in them to a remote management platform which is external to the immersion cooling tank via the second terminal of the management board and issues an alarm of the at least one of the first terminals which have no cable inserted on site.

According to some embodiments of the present application, the method further determines that the management board is the master management board if the levels of at least two of the detected signals are low and the levels of at least one of the detected signals are high.

In a second aspect, an embodiment of the present application provides a management board of an immersion cooling tank. The immersion cooling tank includes a number of power shelves and a number of management boards. Each power shelf corresponds to one management board. Each management board is configured to manage a number of operations of a number of power supply units in a power shelf. Each management board includes at least two first terminals. Each first terminal is configured to enable a communication between the management board and one other management board. The management boards includes one or more master management boards and two or more slave management boards. Each first terminal of each master management board is configured to couple to one first terminal of one slave management board. One first terminal of one master management board is coupled to one first terminal of one slave management board via an RJ45 connector when the one first terminal of the one master management board is coupled to the one first terminal of the one slave management board. The management board includes at least one processor and a storage device. The storage device stores one or more programs, the one or more programs being executed by the at least one processor. The at least one processor detects a signal of each first terminal of the management board. The at least one processor further determines a first number of levels of the detected signals being high and a second number of the levels of the detected signal being low. The at least one processor further determines whether the management board is the master management board or the slave management board according to the first number and the second number. Wherein, the management board is determined to be the master management board if the levels of all of the detected signals are low.

In a third aspect, an embodiment of the present application provides an immersion cooling tank. The immersion cooling tank includes a number of power shelves and a number of management boards. Each power shelf corresponds to one management board. Each management board is configured to manage a number of operations of a number of power supply units in a power shelf. Each management board includes at least two first terminals. Each first terminal is configured to enable a communication between the management board and one other management board. The management boards includes one or more master management boards and two or more slave management boards. Each first terminal of each master management board is configured to couple to one first terminal of one slave management board. One first terminal of one master management board is coupled to one first terminal of one slave management board via an RJ45 connector when the one first terminal of the one master management board is coupled to the one first terminal of the one slave management board. Each management board includes at least one processor and a storage device. The storage device stores one or more programs, the one or more programs being executed by the at least one processor. The at least one processor detects a signal of each first terminal of the management board. The at least one processor further determines a first number of levels of the detected signals being high and a second number of the levels of the detected signal being low. The at least one processor further determines whether the management board is the master management board or the slave management board according to the first number and the second number. Wherein the management board is determined to be the master management board if the levels of all of the detected signals are low.

In a fourth aspect, an embodiment of the present application also provides a non-transitory storage unit. The non-transitory storage device stores one or more programs, the one or more programs being executed by at least one processor of a management board of an immersion cooling tank. The immersion cooling tank includes a number of power shelves and a number of management boards. Each power shelf corresponds to one management board. Each management board is configured to manage a number of operations of a number of power supply units in a power shelf. Each management board includes at least two first terminals. Each first terminal is configured to enable a communication between the management board and one other management board. The management boards includes one or more master management boards and two or more slave management boards. Each first terminal of each master management board is configured to couple to one first terminal of one slave management board. One first terminal of one master management board is coupled to one first terminal of one slave management board via an RJ45 connector when the one first terminal of the one master management board is coupled to the one first terminal of the one slave management board. The at least one processor detects a signal level of each first terminal of the management board. The at least one processor further determines a first number of levels of the detected signals being high and a second number of the levels of the detected signal being low. The at least one processor further determines whether the management board is the master management board or the slave management board according to the first number and the second number. Wherein the management board is determined to be the master management board if the levels of all of the detected signals are low.

Under this disclosure, each management board includes at least two first terminals, each first terminal of each master management board is configured to couple to one first terminal of one slave management board, and one first terminal of one master management board is coupled to one first terminal of one slave management board via an RJ45 connector when the one first terminal of the one master management board is coupled to the one first terminal of the one slave management board. The signal of each first terminal of the management board can be detected, and the management board is determined to be the master management board if all of the detected signals are low level signals. Thus, the master management board can be determined, and it is the master management board which can manage the slave management boards, thus a power distribution requirement of an entire tank can be balanced, and a complexity of the out of band management process can be decreased.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will therefore be appreciated that the embodiments may be modified within the scope of the claims.

In addition, it should be understood that in the description of this application, terms such as "first" and "second" are used only for distinguishing in the description, but are not intended to indicate or imply relative importance or an order. The terms "exemplary" and/or "example" are used herein to mean "serving as an example, instance, or illustration." Any embodiment described herein as "exemplary" and/or "example" is not necessarily to be construed as preferred or advantageous over other embodiments. A feature limited by "first", "second" may expressly or implicitly include one or more of the features. Use of the word "exemplary" is intended to present concepts and techniques in a concrete fashion. As used herein, the term "and/or," includes any and all combinations of one or more of the associated listed items.

It should be noted that the steps shown in the flowcharts can be performed by computer executable instructions in a computer system. In addition, although a logical sequence is shown in the flowcharts, in some circumstance, the shown or described steps may be performed in a sequence which is different from the sequence described herein.

Figure 1:
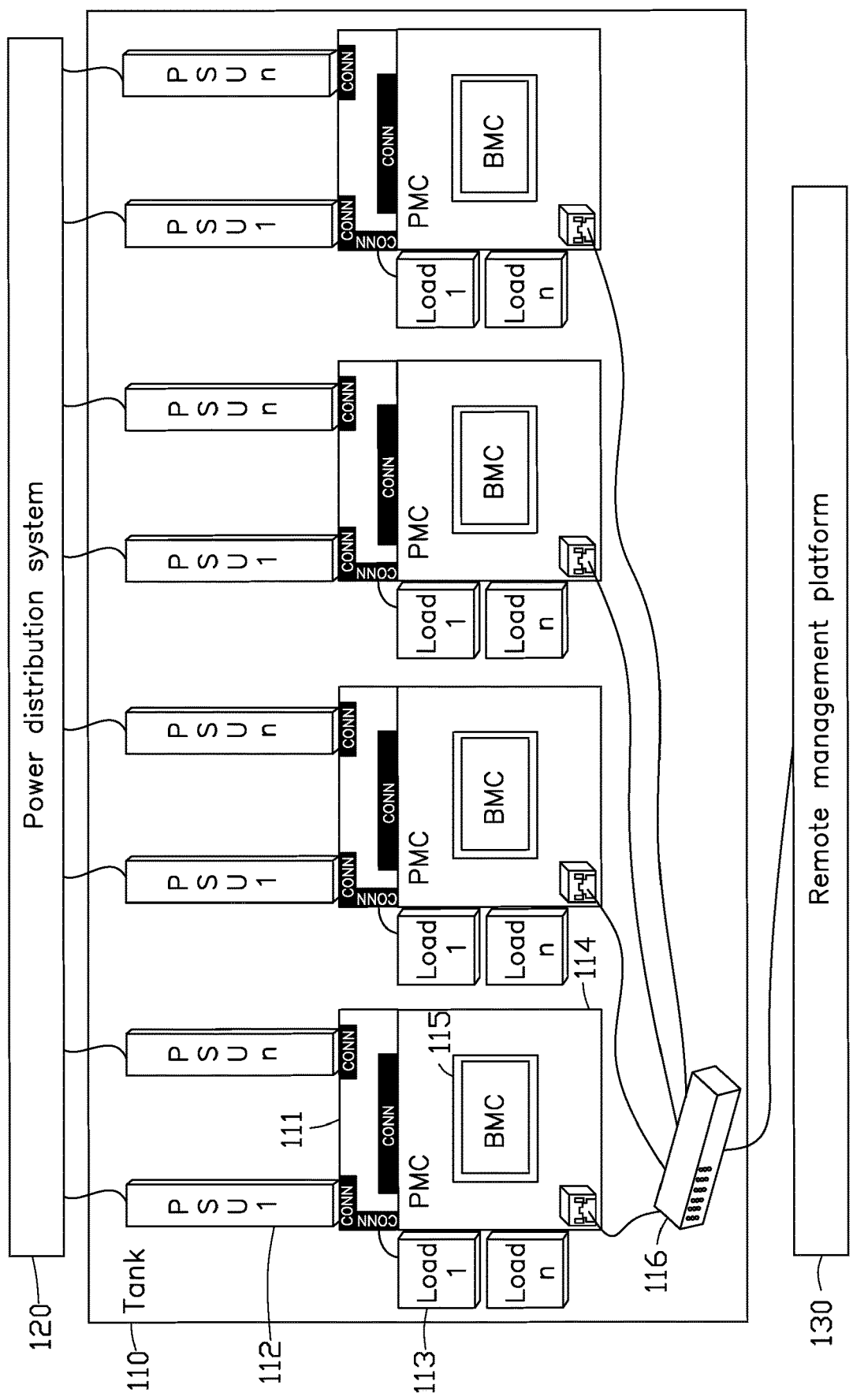
FIG. 1 is a schematic view of an application scenario of an immersion cooling tank in prior art.
Figure 2:
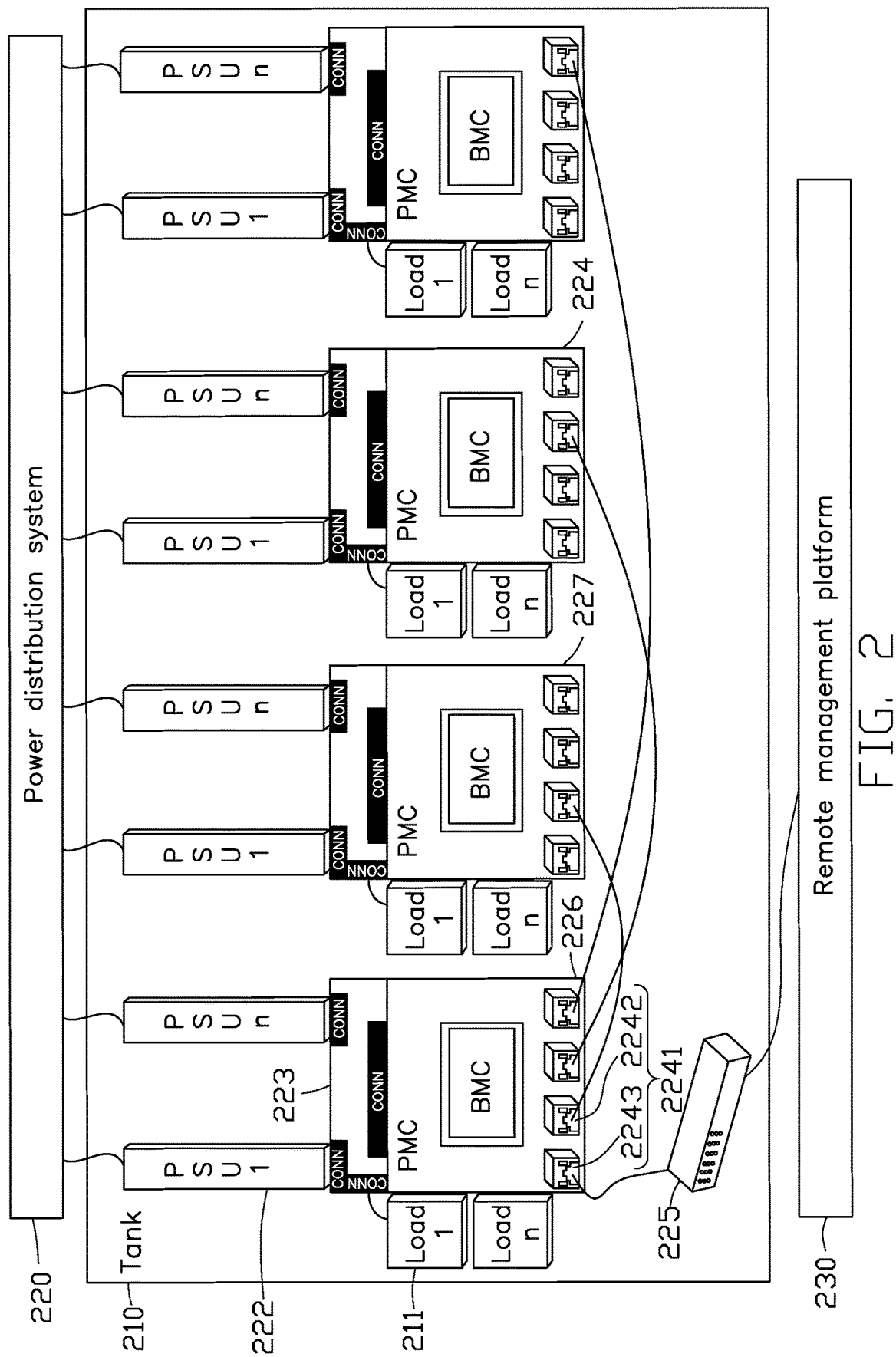
FIG. 2 is a schematic view of an embodiment of an application scenario of an immersion cooling tank.

Referring to FIG. 2, FIG. 2 is a schematic view of an embodiment of an application scenario of an immersion cooling tank. The immersion cooling tank 210 can communicate with a power distribution system 220 and a remote management platform 230. The immersion cooling tank 210 can include a number of loads 211, a number of power supply units (hereinafter PSUs) 222, a number of power shelves 223, a number of management boards 224, and one or more exchangers 225. A person skilled in the art may understand that the structure shown in FIG. 2 does not constitute any limitation on the immersion cooling tank 210. The immersion cooling tank 210 may include more or fewer components than those shown in the figure, some components in the immersion cooling tank 210 may be combined, some components split, or the components may be differently disposed.

The loads 211 can be a number of servers, or a number of heat-generating components, or the like.

The PSUs 222 can convert alternating current voltage of the mains to a low-voltage direct current voltage, and provide the low-voltage direct current voltage to the loads 211. For example, the PSUs 222 can convert 220 volt alternating current voltage provided by the power distribution system 220 to a 54 volt direct current voltage, and provide the 54 volt direct current voltage to the loads 211.

The power shelves 223 can be configured to receive the PSUs 222. Each power shelf 223 can receive a number of PSUs 222. Each power shelf 223 can correspond to one management board 224. In some embodiment, each power shelf 223 can receive one management board 224.

Each management board 224 is configured to monitor a number of operations of the PSUs 222 in the corresponding power shelf 223. Each management board 224 includes a number of terminals 2241. In some embodiments, the terminals 2241 can be a number of RJ45 connectors coupled via the management board's own Universal Asynchronous Receiver and Transmitter (hereinafter UART) terminals, or can be a number of RJ45 connectors coupled via the management board's own Ethernet terminal. In some embodiments, the management board 224 can be a power management controller. It can be understood that, the management board 224 can be a ranking management controller, a system management controller, or the like, the disclosure is not limited herein. Each management board 224 can include a baseboard management controller (hereinafter BMC). In some embodiments, the baseboard management controller can be an AST26XX series chip. The AST26XX series chip has more UART terminals compared with the other series chips. It can be understood that, each UART terminal of the BMC can be coupled to one terminal 2241 of the corresponding management board 224.

In some embodiments, the management boards 224 include one or more master management boards 226 and two or more slave management boards 227. Each master management board 226 can communicate with two or more slave management boards 227. Each master management board 226 is configured to obtain a number of operation data of the PSUs 222 in the power shelves 223 corresponding to the two or more slave management boards 227 from the two or more slave management boards 227, and gather the operation data of the PSUs 222 in the power shelves 223 corresponding to the two or more slave management boards 227 and a number of operation data of the PSUs 222 being monitored in the power shelf 223 corresponding to the master management board 226. Each slave management board 227 communicates with one master management board 226. Each slave management board 227 is configured to transmit the operations of the PSUs 222 in the corresponding power shelf 223 to one master management board 226.

The terminals 2241 of each management board 224 can include two or more first terminals 2242 and a second terminal 2243. The first terminals 2242 are configured to enable communications between the management board 224 and the other management boards. In some embodiments, the first terminals 2242 are configured to enable communications with the other management boards via the RJ45 connector and cables. FIG. 2 illustrates one master management board 226 and three slave management boards 227, but a person skilled in the art may understand that, the number of the master management boards 226 and the number of the slave management boards 227 can be different, and the number of the first terminals 2242 can be different, the disclosure is not limited herein. As shown in the FIG. 2, each master management board 226 can be coupled to three slave management boards 227 via three first terminals 2242 and cables, and each slave management board 227 is coupled to one master management board 226 via one first terminal 2242 and cable.

In some embodiments, each management board 224 can detect a signal of each first terminal 2242 of the management board 224, and determine a first number of high level signals and a second number of low level signals in the detected signals, and thus determine whether the management board 224 is the master management board 226 or the slave management board 227 according to such numbers. Wherein, the management board 224 is determined to be the master management board 226 if the detected signals are all low level signals. Thus, the management board 224 can determine whether it is the master management board 226. The master management board 226 can obtain the operation data of the PSUs 222 in the power shelves 223 corresponding to the slave management boards 227 coupled to the master management board 226 from one or more slave management board 227 coupled to the master management board 226, and gather the operation data of the PSUs 222 in the power shelves 223 corresponding to the one or more slave management boards 227 and a number of monitored operation data of the PSUs 222 in the power shelf 223 corresponding to the master management board 226. In some embodiments, the master management board 226 can further transmit the gathered operation data to the remote management platform 230. Thus, the master management board 226 can be determined, and the master management board 226 can manage the slave management boards 227, thus a power distribution requirement of an entire immersion cooling tank 210 can be balanced, and a complexity of out of band management process can be decreased.

In some embodiments, the second terminal 2243 is configured to enable a communication between the master management board 226 and the remote management platform 230. In some embodiments, the second terminal 2243 is configured to enable a communication between the master management board 226 and the remote management platform 230 via the RJ45 connector and the exchanger 225. In some embodiments, the second terminal 2243 is configured to enable transmission of the gathered operations of the PSUs 222 from the master management board 226 to the remote management platform 230. Thus, management on the PSUs 222 of the immersion cooling tank 210 can be achieved.

Figure 3:
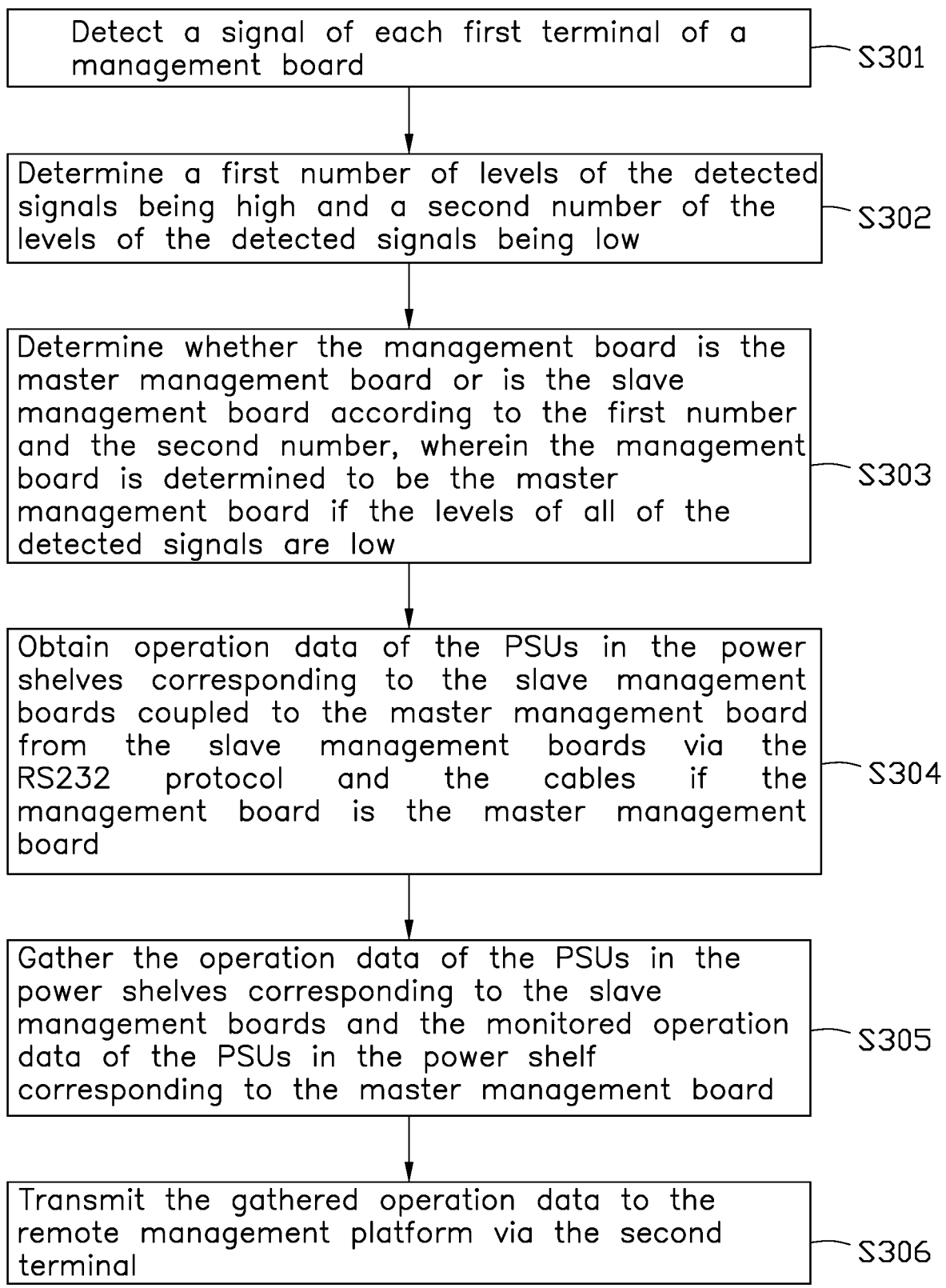
FIG. 3 is a flowchart of an embodiment of a method for managing a management board of an immersion cooling tank.

FIG. 3 is a flowchart of an embodiment of a method for managing the management board of the immersion cooling tank. The method is applied on the management board as shown in the FIG. 2. The management board can be a master management board or a slave management board. The method includes:

S301: detecting a signal of each first terminal of the management board.

Figure 4:
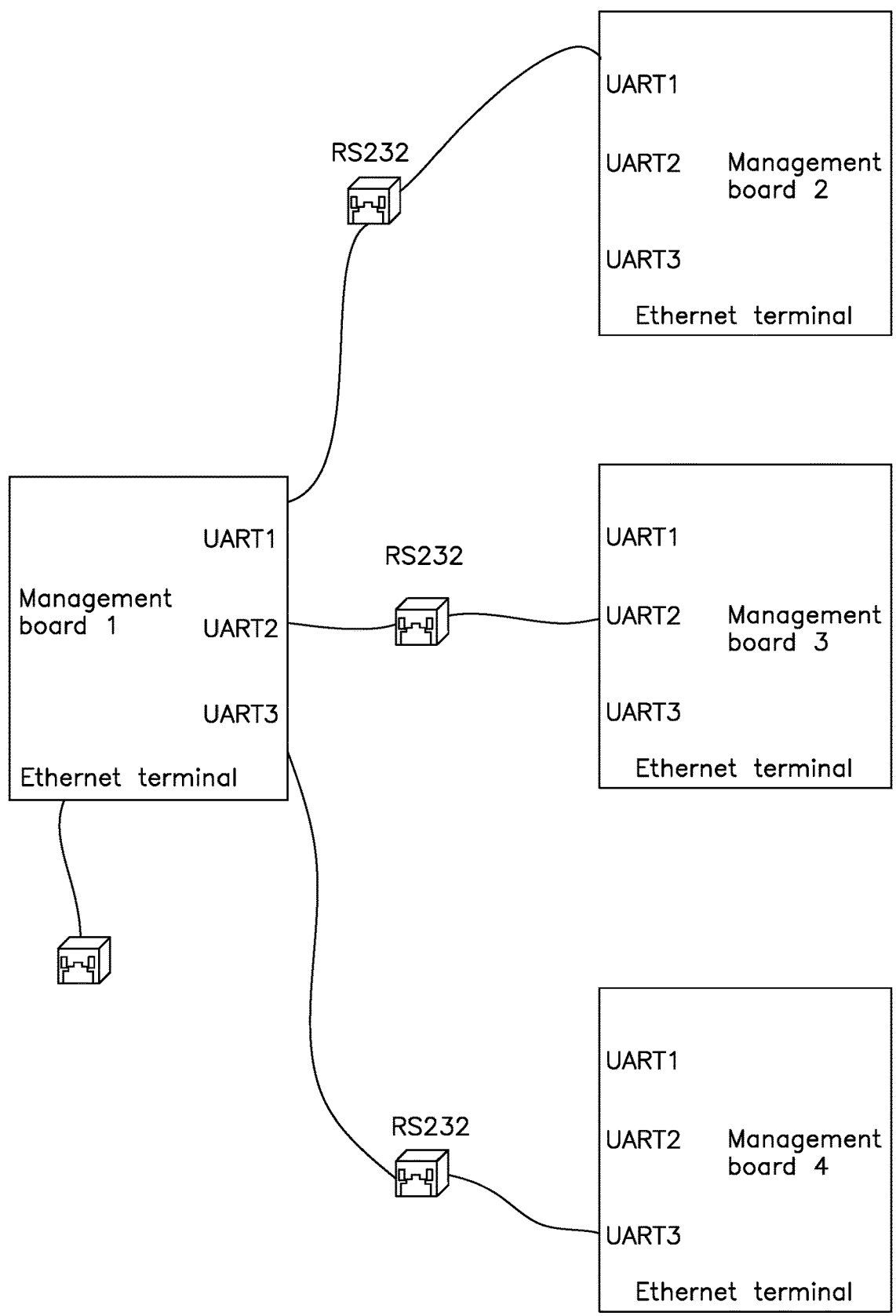
FIG. 4 is a schematic view of an embodiment showing a master management board of the immersion cooling tank communicating with a number of slave management boards.
Figure 5A:
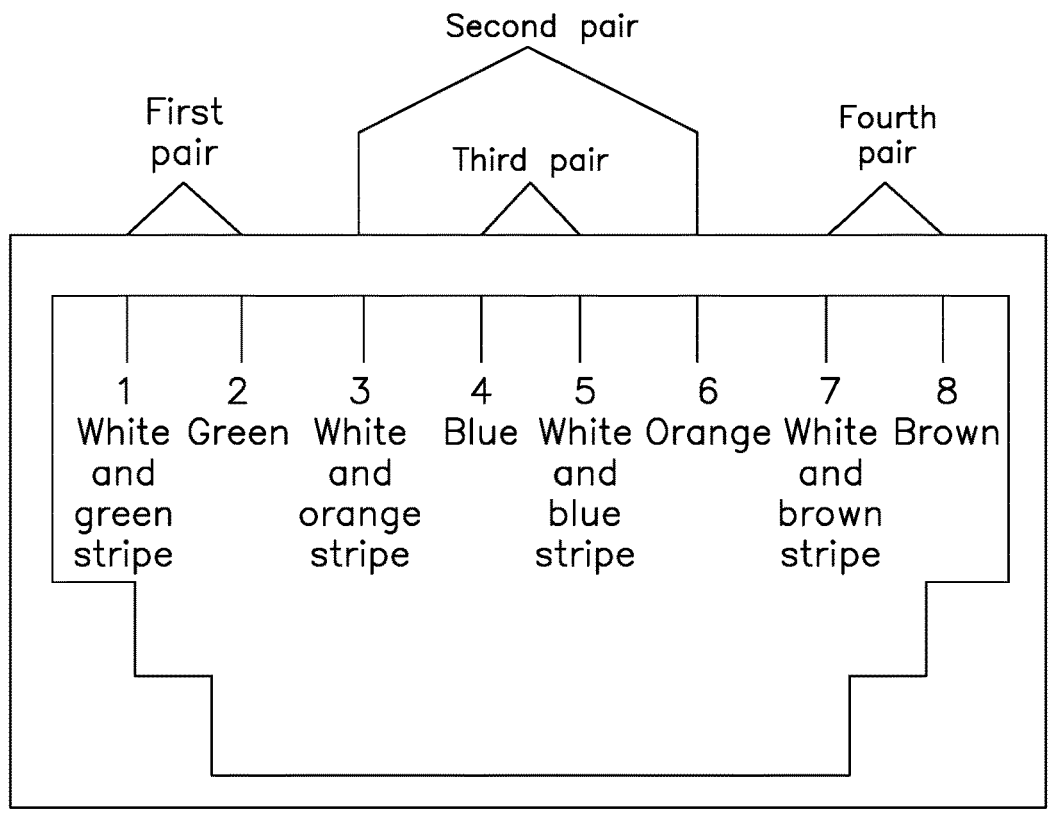
FIG. 5A is a schematic view of an embodiment of a T568A pinout.

In some embodiments, the management board can be the master management board or the slave management board. Each master management board is configured to communicate with the slave management boards. In some embodiments, each first terminal of each master management is configured to communicate with one slave management board, and only one first terminal of the slave management board is configured to be coupled to the master management board. Referring to FIG. 4, a management board 1 can employ cables to couple to a management board 2, a management board 3, and a management board 4 via the RS232 protocol, and the management board 2, the management board 3, and the management board 4 use cables to couple to the management board 1 via the RS232 protocol. The RS232 protocol is commonly know in the art, therefor, a detailed description is not necessary for an understanding of this invention. In detail, each first terminal of each management board can be an RJ45 connector coupled via the management board's own UART terminal, for example, UART1, UART2, and UART3. Each cable carries a T568A style RJ45 connector and a T568B style RJ45 connector on two ends. In some embodiments, each first terminal of each management board can be an RJ45 jack coupled via the management board's own UART terminal, and the ends of each cable are respectively a T568A style RJ45 plug and a T568B style RJ45 plug. Referring to FIG. 5A, there are eight wires inside the T568A style corresponding to pins 1-8 of the T568A style. These eight wires may be color-coded, the color coding for the eight wires may be (1) white and green stripe; (2) green; (3) white and orange stripe; (4) blue; (5) white and blue stripe; (6) orange; (7) white and brown stripe; and (8) brown. These eight wires are twisted into 4 pairs of wires, respectively white and green stripe & green, white and orange stripe & orange, white and blue stripe & blue, and white and brown stripe & brown.

Figure 5B:
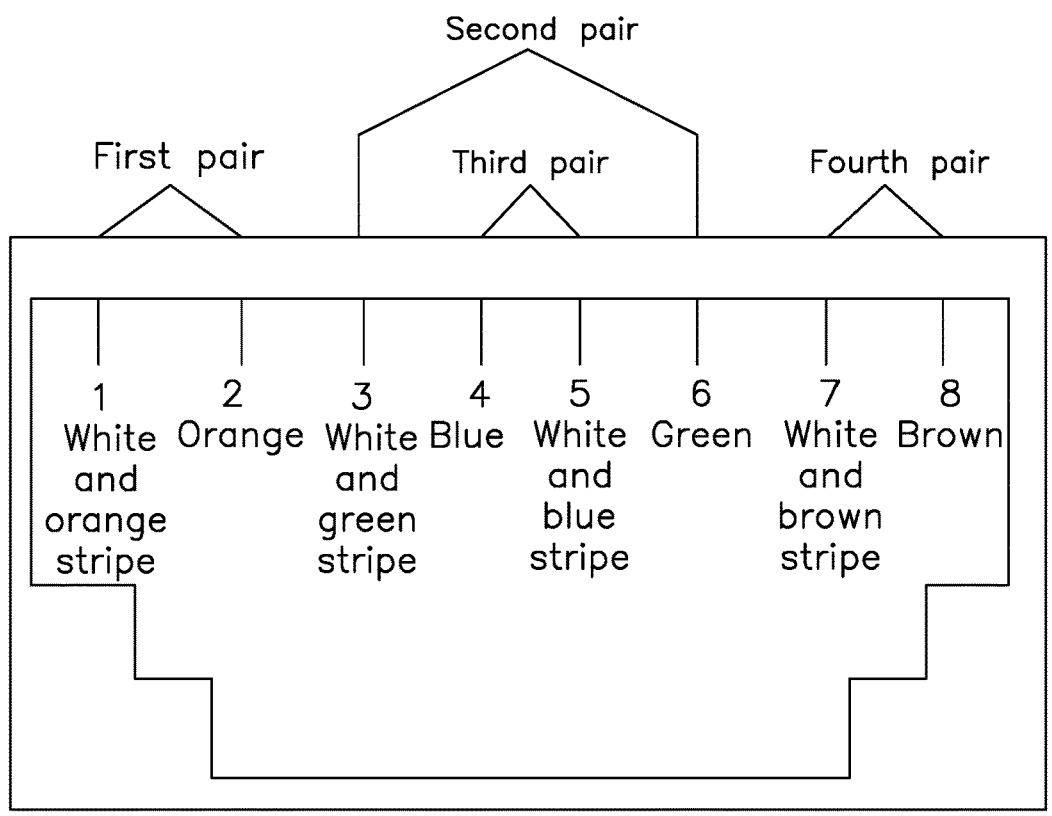
FIG. 5B is a schematic view of an embodiment of a T568B pinout.

In FIG. 5B, there are eight wires inside the T568B style corresponding to pins 1-8 of the T568A style. These eight wires may be color-coded, the color coding for the eight wires may be (1) white and orange stripe; (2) orange; (3) white and green stripe; (4) blue; (5) white and blue stripe; (6) green; (7) white and brown stripe; and (8) brown. These eight wires are twisted into 4 pairs of wires, respectively white and orange stripe & orange, white and green stripe & green, white and blue stripe & blue, and white and brown stripe & brown.

Figure 6:
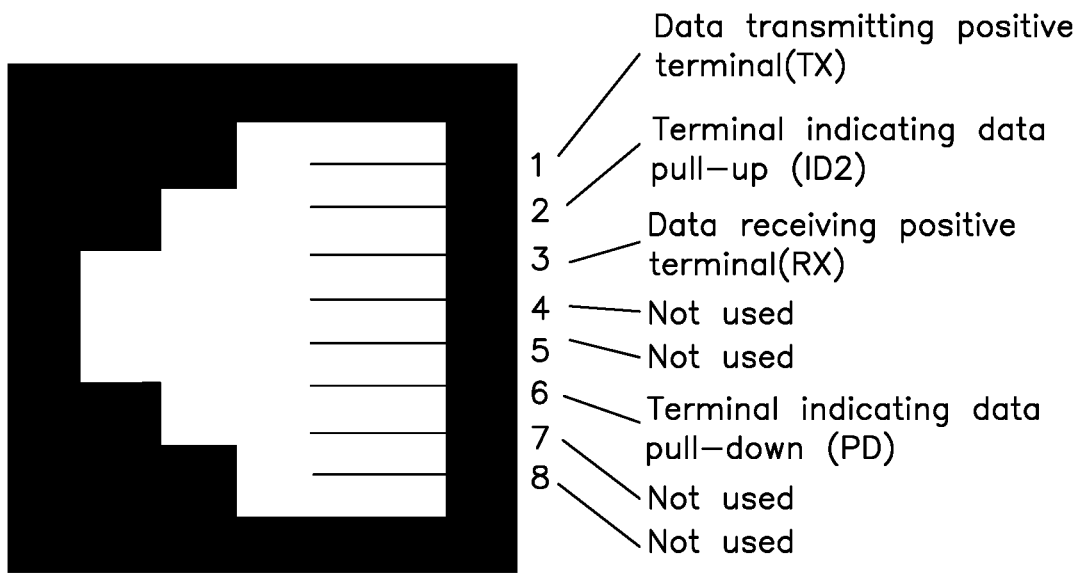
FIG. 6 is a schematic view of an embodiment of pin identification of an RJ45 connector.

In some embodiments, referring to FIG. 6, the RJ45 connector includes eight pins, respectively a pin 1, a pin 2, a pin 3, a pin 4, a pin 5, a pin 6, a pin 7, and a pin 8. The pin 1 is a data transmitting positive terminal, the pin 2 is a terminal indicating data pull-up, the pin 3 is a data receiving positive terminal, pins 4-5 are not used, the pin 6 is a terminal indicating data pull-down, and pins 7-8 are not used.

Figure 7:
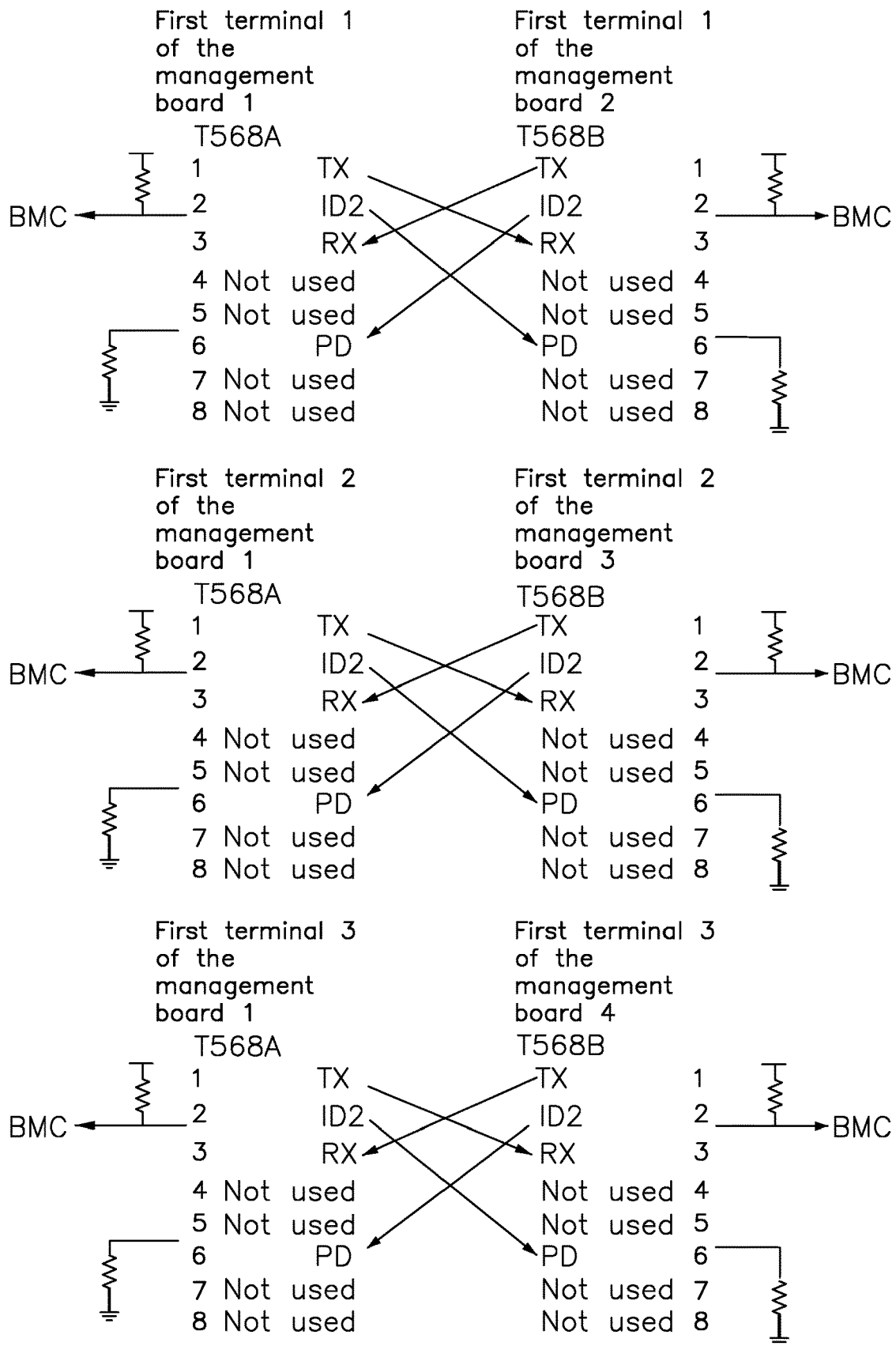
FIG. 7 is a diagram view of an embodiment showing detection by a management board of a number of levels of the first terminals.

Each management board communicates with another management board via the pins in the RJ45 connector. Referring to FIG. 7, the BMC of each management board is coupled to the pin 2 of each first terminal of the management board. The BMC is configured to detect a level of the pin 2 of the first terminal. For each first terminal of each management board, a high level signal is applied to the pin 2 via a pull-up resistor, and a low level signal is applied to a pin 6 via a pull-down resistor. In some embodiments, each first terminal of each management board is coupled to a power source via the pull-up resistor and is grounded via the pull-down resistor.

In some embodiments, the RJ45 connector of the cable through which one end of one master management board is coupled to one salve management board can be a T568A style RJ45 connector, and the RJ45 connector of the cable through which one end of the one slave management board is coupled to the one master management board can be a T568B style RJ45 connector. The pin 1 of each first terminal of each master management board is configured to couple to the pin 3 of one first terminal of one slave management board. The pin 2 of each first terminal of each master management board is configured to couple to the pin 6 of one first terminal of one slave management board. The pin 3 of each first terminal of each master management board is configured to couple to the pin 1 of one first terminal of one slave management board. The pin 6 of each first terminal of each master management board is configured to couple to the pin 2 of one first terminal of one slave management board. Thus, each master management board can communicate with the corresponding slave management boards.

As shown in the FIG. 7, the first terminals of each management board include a first terminal 1, a first terminal 2, and a first terminal 3. The pin 1 of the first terminal 1 of the management board 1 is coupled to the pin 3 of one first terminal of the management board 2 via the cable. The pin 2 of the first terminal 1 of the management board 1 is coupled to the pin 6 of the one first terminal of the management board 2 via the cable. The pin 3 of the first terminal 1 of the management board 1 is coupled to the pin 1 of the one first terminal of the management board 2 via the cable. The pin 6 of the first terminal 1 of the management board 1 is coupled to the pin 2 of the one first terminal of the management board 2 via the cable. The pin 1 of the first terminal 2 of the management board 1 is coupled to the pin 3 of one first terminal of the management board 3 via the cable. The pin 2 of the first terminal 2 of the management board 1 is coupled to the pin 6 of the one first terminal of the management board 3 via the cable. The pin 3 of the first terminal 2 of the management board 1 is coupled to the pin 1 of the one first terminal of the management board 3 via the cable. The pin 6 of the first terminal 2 of the management board 1 is coupled to the pin 2 of the one first terminal of the management board 3 via the cable. The pin 1 of the first terminal 3 of the management board 1 is coupled to the pin 3 of one first terminal of the management board 4 via the cable. The pin 2 of the first terminal 3 of the management board 1 is coupled to the pin 6 of the one first terminal of the management board 4 via the cable. The pin 3 of the first terminal 3 of the management board 1 is coupled to the pin 1 of the one first terminal of the management board 4 via the cable. The pin 6 of the first terminal 3 of the management board 1 is coupled to the pin 2 of the one first terminal of the management board 4 via the cable. In the FIG. 7, each arrow head indicates a flow of a signal.

It can be understood that the RJ45 connector of the cable through which one end of one master management board is coupled to one slave management board can be a T568B style RJ45 connector, and the RJ45 connector of the cable through which one end of the one slave management board is coupled to the one master management board can be a T568A style RJ45 connector, the disclosure is not limited herein.

In some embodiments, before one first terminal of one master management board is coupled to one first terminal of one salve management board, for each first terminal of each master management board, the high level signal is applied to the pin 2 via the pull-up resistor, and the BMC of the one master management board can detect that the signal level of the pin 2 of the one first terminal is high. At the moment, for each first terminal of each slave management board, the high level signal is applied to the pin 2 via the pull-up resistor, thus the BMC of the one slave management board can detect that the signal level of the pin 2 of the first terminal is high. When one first terminal of one master management board is coupled to one first terminal of one slave management board, the pin 2 of the one first terminal of the one master management board is coupled to the pin 6 of the one first terminal of the one slave management board. For each first terminal of each slave management board, the low level signal is applied to the pin 6 via the pull-down resistor, thus the BMC of the one master management board can detect that the signal level of the pin 2 of the first terminal is low. At the moment, the pin 2 of the one first terminal of the one slave management board is coupled to the pin 6 of the one first terminal of the one master management board. For each first terminal of each master management board, the low level signal is applied to the pin 6 via the pull-down resistor, thus the BMC of the one slave management board can detect that the level of the pin 2 of the first terminal is low. Thus, the disclosure can detect a high level signal or a low level signal of the pin 2 of the one first terminal to determine whether the one first terminal has the cable inserted. Wherein, the level of the pin 2 of the one first terminal is low if the one first terminal has the cable inserted. The level of the pin 2 of the one first terminal is high if the one first terminal has no cable inserted. As shown in the FIG. 7, all first terminals of the management board 1 have cables inserted, thus the signals of all first terminals of the management board 1 are low level signals. One first terminal of the management board 2 has cable inserted, thus the signal of the one first terminal of the management board 2 is low level signals and the signals of the other first terminals of the management board 2 are high level signals.

S302: determining a first number of levels of the detected signals being high and a second number of the levels of the detected signals being low.

In some embodiments, the detected signals correspond to the number of the first terminals of the management board. As shown in the FIG. 4, the number of the detected signals of the management board 1 correspond to the number of the first terminals of the management board 1. For example, the number of the detected signals of the management board 1 is three. In the FIG. 4, the first number of levels of the detected signals of the management board 1 being high is zero, and the second number of levels of the detected signals of the management board 1 being low is three. The first number of levels of the detected signals of the management board 2 being high is two, and the second number of levels of the detected signals of the management board 2 being low is one. The first number of levels of the detected signals of the management board 3 being high is two, and the second number of levels of the detected signals of the management board 2 being low is one. The first number of levels of the detected signals of the management board 4 being high is two, and the second number of levels of the detected signals of the management board 4 being low is one.

S303: determining whether the management board is the master management board or is the slave management board according to the first number and the second number. Wherein the management board is determined to be the master management board if the levels of all of the detected signals are low.

In some embodiments, a first number of first terminals of the management board having cables inserted and a second number of first terminals of the management board having no cable inserted are determined according to the first number and the second number. Thus, the management board can be determined to be either the master management board or the slave management board according to the first number of first terminals of the management board having cables inserted and the second number of first terminals of the management board having no cable inserted.

As shown in the FIG. 4, if the levels of the three signals of the management board 1 detected by the management board 1 are all low, thus three first terminals of the management board 1 have cables inserted, and the management board 1 can be determined to be the master management board.

In some embodiments, if the level of one of the detected signals is low, and the levels of the other are high, thus the management board can be determined to be the slave management board. As shown in the FIG. 4, if the level of one of three signals of the management board 2 detected by the management board 2 is low, and the levels of two of the three signals of the management board 2 detected by the management board 2 are high, the management board 2 can be determined to be the slave management board.

S304: obtaining operation data of the PSUs in the power shelves corresponding to the slave management boards coupled to the master management board from the slave management boards via the RS232 protocol and the cables if the management board is the master management board.

In some embodiments, the operation data of each PSU in each power shelf can include a power monitoring, a voltage monitoring, a current monitoring, a malfunction monitoring, and so on.

S305: gathering the operation data of the PSUs in the power shelves corresponding to the slave management boards and the monitored operation data of the PSUs in the power shelf corresponding to the master management board.

S306: transmitting the gathered operation data to the remote management platform via the second terminal.

In some embodiments, the second terminal of the management board can be an RJ45 connector coupled via the management board's own Ethernet terminal.

In some embodiments, the second terminal of the master management board is coupled to the exchanger of the immersion cooling tank, thus the master management board can communicate with the remote management platform via the exchanger. As shown in the FIG. 4, the second terminal of the management board 1 communicates with the remote management platform via the exchanger. Where none of the second terminals of the management board 2, the management board 3, and the management board 4 is coupled to the exchanger. None of the second terminals of the management board 2, the management board 3, and the management board 4 can communicate with the remote management platform.

It can be understood that steps S304, S305, and S306 can be omitted, or S306 can be omitted, the disclosure is not limited herein.

In some embodiment, the method further includes a step a11 and a step a12. The step a11 includes detecting a state of a second terminal of the management board if the levels of all detected signals are high. The step a12 includes determining that the management board is the master management board if the state of the second terminal of the management board is a normal communication state.

In some embodiments, the method further includes a step b11. The step b11 includes determining that the management board is the slave management board if the state of the second terminal of the management board is in abnormal state.

In some embodiments, if the levels of all of the detected signals are high, the management board enters into a constant monitoring state to monitor whether the second terminal of the management board has received the data. If the second terminal of the management board has received the data, the state of the second terminal of the management board is a normal communication state, thus the management board can be determined to be the master management board. If the second terminal of the management board has not received the data, the state of the second terminal of the management board is in abnormal state, thus the management board can be determined to be the slave management board. It can be understood that, the disclosure enables monitoring as to whether the second terminal of the management board has received the data in a preset duration, the disclosure is not limited herein.

In some embodiments, for each first terminal of each master management board configured to couple to one slave management board, if the levels of all of the detected signals are high, one or more terminals in the first terminals of the management board are determined to have no cable inserted, and the management board is determined to be in an abnormal state. Thus, the method further includes a step c11. The step c11 includes transmitting log information of at least one of the first terminals which have no cable inserted to the remote management platform and issuing an alarm of the at least one of the first terminals which have no cable inserted on site if the management board is the master management board.

In some embodiments, the method further includes a step d11. The step d11 includes issuing an alarm of the at least one of the first terminals which have no cable inserted on site if the management board is the slave management board.

In some embodiments, the disclosure transmits the log information of at least one of the first terminals which have no cable inserted to the remote management platform, thus maintenance staffs do not need come on site to the tank, and can know the one or more terminals which have no cable inserted from the remote management platform. In some embodiments, the alarm can be given via an indicator light. It can be understood that, the disclosure can sound a buzzer, or the like, the disclosure is not limited herein. The maintenance staff can directly know the one or more terminals which have no cable inserted because of the alarm.

In some embodiments, the method further includes a step e11. The step e11 includes determining that the management board is the master management board if the levels of at least two of the detected signals are low, and the levels of at least one of the detected signals are high.

In some embodiments, for each first terminal of each master management board configured to couple to one slave management board, if the levels of at least two of the detected signals are low and the levels of at least one of the detected signals are high, one or more terminals in the first terminals of the master management board are determined to have no cable inserted, and the master management board is determined to be in an abnormal state. Thus, the method further includes a step f11. The step f11 includes transmitting log information of at least one of the first terminals which have no cable inserted to the remote management platform and issuing an alarm of the at least one of the first terminals which have no cable inserted on site if the management board is the master management board.

In some embodiments, the detecting of the signal of each first terminal of the management board includes a step g11. The step g11 includes detecting the signals of the first terminals of the management board in a sequence.

The method further includes a step h11. The step h11 includes transmitting the log information of at least one of the first terminals which have no cable inserted to the remote management platform and issuing an alarm of the at least one of the first terminals which have no cable inserted on site if the levels of all of the detected signals are high and the management board is the master management board.

The method further includes a step I11. The step I11 includes issuing an alarm of the at least one of the first terminals which have no cable inserted if the levels of all of the detected signals are high and the management board is the slave management board.

The method further includes a step J11. The step J11 includes transmitting the log information of at least one of the first terminals which have no cable inserted to the remote management platform and issuing an alarm of the at least one of the first terminals which have no cable inserted on site if the levels of all of the detected signals are high and the management board is the master management board.

It can be understood that, each first terminal can further be a UART terminal, the management board can be coupled to the RJ45 connectors via the UART terminals, and be coupled to the cables via the RJ45 connectors, wherein the pins 1-8 of each UART terminal are respectively coupled to the pins 1-8 of the RJ45 connector; each second terminal can further be the Ethernet terminal, the management board can be coupled to the RJ45 connector via the Ethernet terminal, and be coupled to the exchanger via the RJ45 connector, the disclosure is not limited herein.

Figure 8:
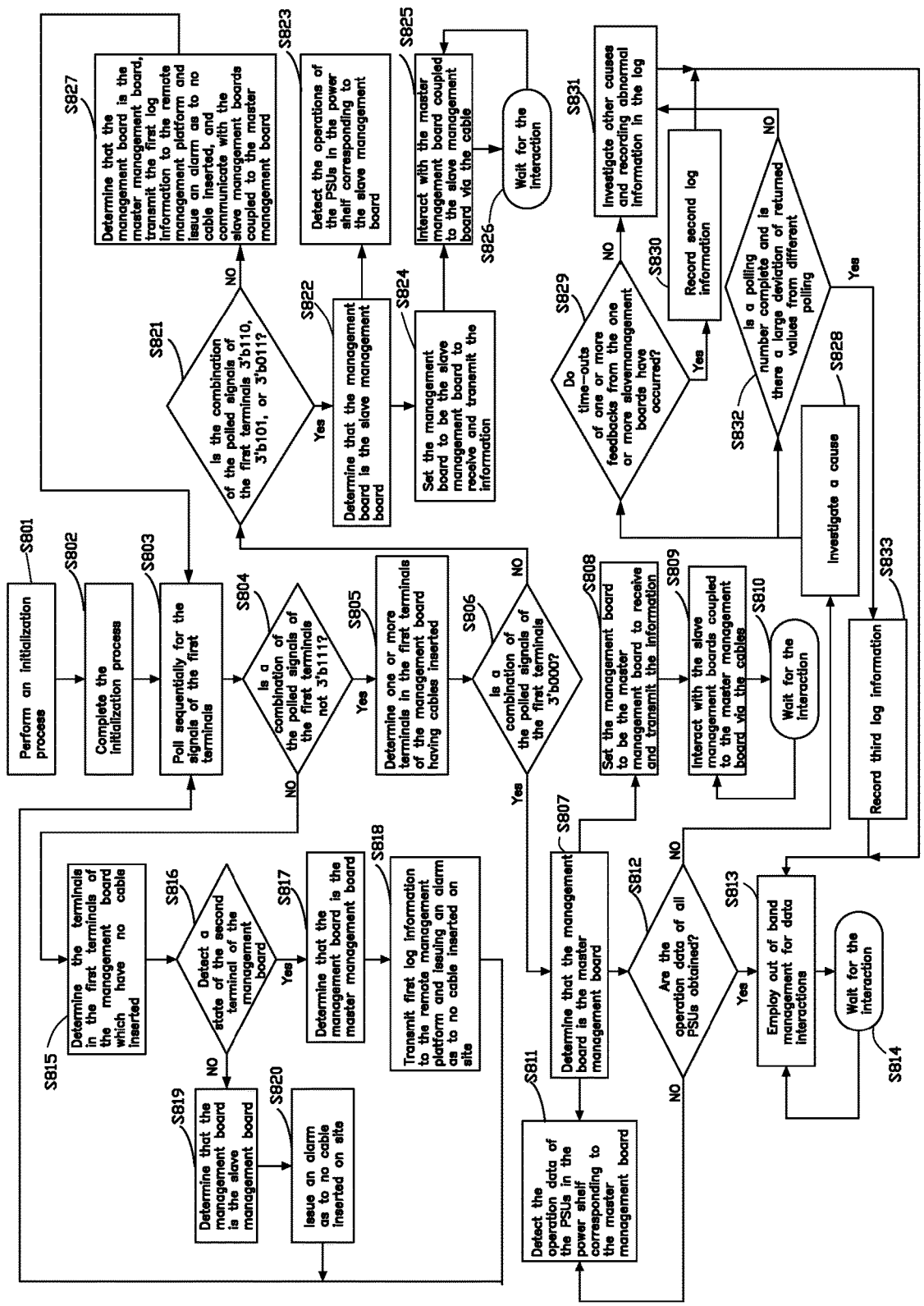
FIG. 8 is a flowchart of another embodiment of a method for managing a management board of an immersion cooling tank.

FIG. 8 is a flowchart of another embodiment of a management method for a management board of an immersion cooling tank. The method is applied on the management board as shown in the FIG. 2. The management board can be a master management board or a slave management board. The method includes:

S801: performing an initialization process.

S802: completing the initialization process. Thus the management board is started completely.

S803: polling sequentially for the signals of the first terminals.

S804: determining whether a combination of the polled signals of the first terminals is not 3'b111. If the combination of the polled signals of the first terminals is not 3'b111, the procedure goes to S805. If the combination of the polled signals of the first terminals is 3'b111, the procedure goes to S815.

S805: determining one or more terminals in the first terminals of the management board having cables inserted.

S806: determining whether a combination of the polled signals of the first terminals is 3'b000. If the combination of the polled signals of the first terminals is 3'b000, the procedure goes to S807. If the combination of the polled signals of the first terminals is not 3'b000, the procedure goes to S821.

S807: determining that the management board is the master management board. Then, the procedure goes to S808 and S811.

S808: setting the management board to be the master management board to receive and transmit information.

S809: interacting with the slave management boards coupled to the master management board via the cables. The interaction with the slave management boards coupled to the master management board via the cables can include obtaining the operation data of the PSUs in the power shelves corresponding to the slave management boards coupled to the master management board via the cables from the slave management boards.

S810: waiting for the interaction. If an interaction occurs, the procedure goes to S809. Otherwise, the procedure goes to S810.

S811: detecting the operation data of the PSUs in the power shelf corresponding to the master management board.

S812: determining whether the operation data of all PSUs are obtained. In some embodiments, the method determines whether the operation data of the PSUs in the power shelf corresponding to the master management board and the operation data of the PSUs in the power shelves corresponding to the slave management boards coupled to the master management board are obtained. If the operation data of the PSUs in the power shelf corresponding to the master management board and the operation data of the PSUs in the power shelves corresponding to the slave management boards coupled to the master management board are obtained, the procedure goes to S813. If the operation data of the PSUs in the power shelf corresponding to the master management board and the operation data of the PSUs in the power shelves corresponding to the slave management boards coupled to the master management board are not obtained, the procedure goes to S828.

S813: employing out of band management for data interactions. In some embodiments, the method transmits the operation data of the PSUs in the power shelf corresponding to the master management board and the operation data of the PSUs in the power shelves corresponding to the slave management boards coupled to the master management board to the remote management platform, to employ out of band management for data interactions.

S814: waiting for the interaction. If an interaction occurs, the procedure goes to S813. Otherwise, the procedure goes to S814.

S815: determining the terminals in the first terminals of the management board which have no cable inserted.

S816: detecting a state of the second terminal of the management board. If the state of the second terminal of the management board is a normal communication state, the procedure goes to S817. If the state of the second terminal of the management board is in abnormal state, the procedure goes to S819.

S817: determining that the management board is the master management board.

S818: transmitting first log information to the remote management platform and issuing an alarm as to no cable inserted on site. The first log information can be the log information as to no inserted cable. Then, the procedure goes to S803.

S819: determining that the management board is the slave management board.

S820: issuing an alarm as to no cable inserted on site. Then, the procedure goes to S803.

S821: determining whether the combination of the polled signals of the first terminals is 3'b110, 3'b101, or 3'b011. If the combination of the polled signals of the first terminals is 3'b110, 3'b101, or 3'b011, the procedure goes to S822. If the combination of the polled signals of the first terminals is not 3'b110, 3'b101, or 3'b011, the procedure goes to S827.

S822: determining that the management board is the slave management board. Then, the procedure goes to S823 and S824.

S823: detecting the operations of the PSUs in the power shelf corresponding to the slave management board.

S824: setting the management board to be a slave management board to receive and transmit information.

S825: interacting with the master management board coupled to the slave management board via the cable. The interacting with the master management board coupled to the slave management board via the cable can include, transmitting the operations of the PUSs in the power shelf corresponding to the slave management board to the master management board.

S826: waiting for the interaction. If an interaction occurs, the procedure goes to S825. Otherwise, the procedure goes to S826.

S827: determining that the management board is the master management board, transmitting the first log information to the remote management platform and issuing an alarm as to no cable inserted, and communicating with the slave management boards coupled to the master management board. Then, the procedure goes to S803.

S828: investigating a cause. The investigation of cause can be inspecting why the operation data of the PSUs in the power shelves corresponding to the slave management boards coupled to the master management board are not obtained. Then, the procedure goes to S829 and S832.

S829: determining whether time-outs of one or more feedbacks from the one or more slave management boards have occurred. It can be understood that, the timeout period can be set according to the need, the disclosure is not limited herein. If time-out of one or more feedbacks from the one or more slave management boards has occurred, the procedure goes to S830. If time-out of one or more feedbacks from the one or more slave management boards has not happened, the procedure goes to S831.

S830: recording second log information. The second log information can be the log information as to time-outs of the feedbacks from the slave management boards. Then, the procedure goes to S813.

S831: investigating other causes and recording abnormal information in the log. Then, the procedure goes to S813.

S832: determining whether a polling number is complete and whether there is a large deviation of returned values from different polling. If the polling number is complete and there is a large deviation, the procedure goes to S833. If the polling number is complete and there is not a large deviation, the procedure goes to S831.

S833: recording third log information. The third log information can be the log information as to the polling number being complete and there is a large deviation of returned values from different polling. Then, the procedure goes to S813.

Figure 9:
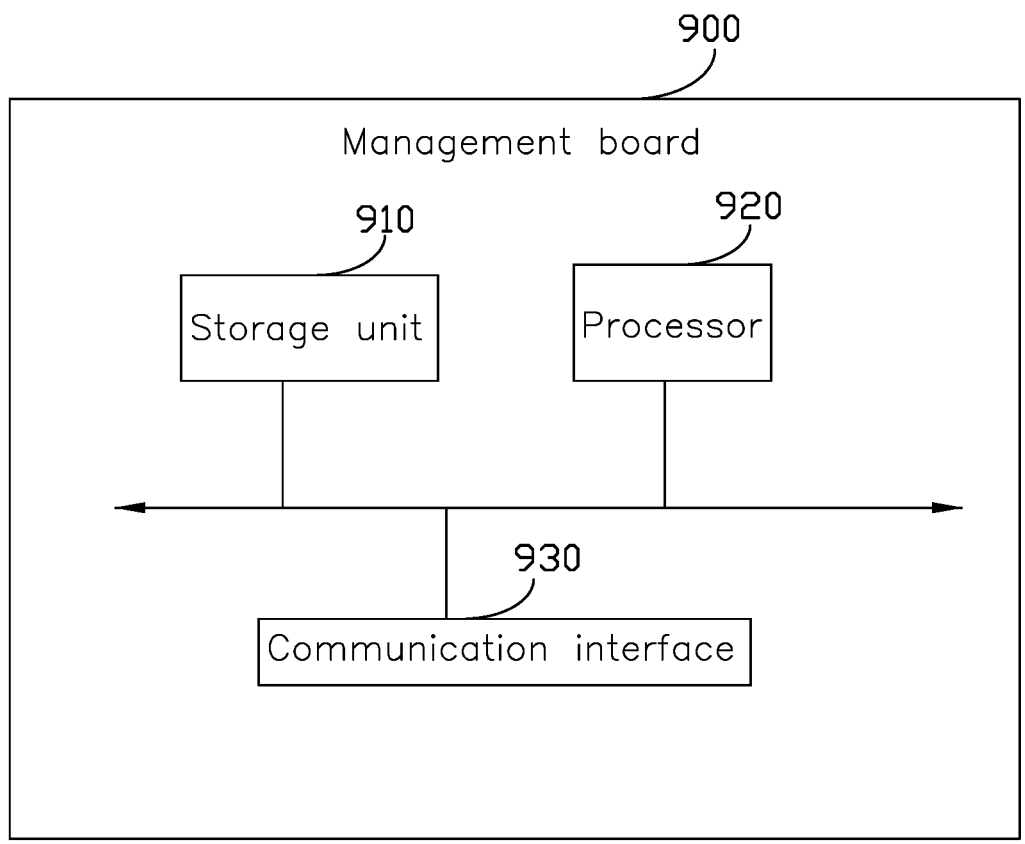
FIG. 9 is a schematic view of an embodiment of a management board of an immersion cooling tank.

FIG. 9 is a schematic view of an embodiment of a management board of an immersion cooling tank. The management board 900 can include a storage unit 910, a processor 920, and a communication interface 930. A person skilled in the art may understand that the structure shown in FIG. 9 imposes no limitation on the management board 900, and the management board 900 may include more or fewer components than those shown in the figure, or may combine or divide some components, or have different component arrangements.

The storage unit 910 may be configured to store a software program and module/unit. The processor 920 runs the software program and modules/units stored in the storage unit 910, and invokes the data stored in the storage unit 910, to implement various functions of the management board 900. The storage unit 910 may include a program storage area and a data storage area. The program storage area may store an application program, and the like. The data storage area may store data (such as various test results) created according to use of the management board 900, and the like. In addition, the storage unit 910 may include a non-transitory storage medium, such as hard disk, memory, or the like. It can be understood that the storage unit 910 may further include a non-transitory storage medium, such as a pluggable hard disk, a smart media card, a secure digital card, a flash card, at least one magnetic disk storage device, a flash storage unit, or another volatile solid-state storage device.

The processor 920 can include one or more central processing units, and further include general-purpose processors, digital signal processors, application specific integrated circuits, field-programmable gate arrays, or other programmable logic devices, discrete gate or transistor logic, discrete hardware components, and so on. The processor 920 can be a microprocessor or the processor 920 can be any conventional processor. The processor 920 is the control center of the management board 900, and is connected to various parts of the management board 900 by using various interfaces and lines.

The communication interface 930 can include an Ethernet interface, and the like. The communication interface 930 is configured to enable a communication between the management board 900 and the exchanger.

In some embodiments, the embodiments of the present disclosure further provide a computer storage medium where computer executable instructions are stored herein, the computer executable instructions are used for executing the validation method in the FIG. 3.

The disclosure detects a signal of each first terminal of the management board when the master management board is coupled to the slave management board. The method further determines a first number of high level signals and a second number of low level signals in the detected signals. The method further determines whether the management board is the master management board or the slave management board according to the first number of high level signals and the second number of low level signals. Wherein, the management board is determined to be the master management board if the levels of the detected signals are all low. Thus, the master management board can be determined, and the master management board can manage the slave management boards, thus a power distribution requirement of an entire tank can be balanced, and a complexity of the out of band management can be decreased.

In the several embodiments provided in the present application, it should be understood that the disclosed device and method may be implemented in other manners. For example, the described device embodiment is merely exemplary. For example, the module division or the unit division is merely a logical function division and there may be other bases of division in actual implementation. For example, multiple units or components may be combined or integrated into another device, or some features may be omitted or not performed.

In addition, functional units in the embodiments of the present invention may be integrated into one processing unit, or each of the units may exist alone physically, or two or more units are integrated into one unit.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any function that can be performed by a computer program can be implemented using corresponding hardware. Moreover, a specific hardware structure used to achieve a same function may be of various forms, for example, in a form of an analog circuit, a digital circuit, a dedicated circuit, or the like. However, in most cases of the present disclosure, implementation is done by software program. Based on such an understanding, the technical solutions of the present disclosure essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (DSL)) or a wireless manner (for example, infrared, radio, or microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for managing a management board of an immersion cooling tank, the method being applied on the management board of the immersion cooling tank, the immersion cooling tank comprising a plurality of power shelves and a plurality of management boards, each of the power shelves corresponding to one of the management boards, each of the management boards being configured to manage a plurality of operations of a plurality of power supply units in the corresponding power shelf, each of the management boards comprising at least two first terminals, each of the first terminals being configured to enable a communication between the management board and one other management board, the management boards comprising one or more master management boards and two or more slave management boards, each of the first terminals of each of the master management boards being configured to couple to one of the first terminals of one of the slave management boards, any one of the first terminals of any one of the master management boards being coupled to one corresponding of the first terminals of one corresponding of the slave management boards via an RJ45 connector when the any one of the first terminals of the any one of the master management boards is coupled to the corresponding one of the first terminals of the corresponding one of the slave management boards, the method comprising:

detecting a signal of each of the first terminals of the management board;
   determining a first number of levels of the detected signals being high and a second number of the levels of the detected signals being low;
   determining whether the management board is the master management board or the slave management board according to the first number and the second number, wherein the management board is determined to be the master management board if the levels of all of the detected signals are low.

2. The method according to claim 1, wherein the detecting the signal of each of the first terminals of the management board comprises:

detecting a signal of a pin 2 of each of the first terminals of the management board to detect the signal of each of the first terminals of the management board, wherein a high level signal is applied to the pin 2 of each of the first terminals of the management board via a pull-up resistor, and a low level signal is applied to a pin 6 of each of the first terminals of the management board via a pull-down resistor; the pin 2 of each of the first terminals of each of the management boards is coupled to the pin 6 of one of the first terminals of the other management board when each of the first terminals of the management board are coupled to the one of the first terminals of the other management board.

3. The method according to claim 1, wherein the method further comprises:

obtaining a plurality of operation data of the power supply units in the power shelves corresponding to the slave management boards coupled to the master management board from the slave management boards coupled to the master management board via an RS232 protocol, if the management board is the master management board;
   gathering the operation data of the power supply units in the power shelves corresponding to the slave management boards and monitored operation data of the power supply units in the power shelf corresponding to the master management board.

4. The method according to claim 1, wherein the method further comprises:

determining that the management board is the slave management board if the level of one of the detected signals is low and the levels of the other of the detected signals are high.

5. The method according to claim 1, wherein the method further comprises:
    detecting a state of a second terminal of the management board if the levels of all of the detected signals are high;
    determining that the management board is the master management board if the state of the second terminal of the management board is in a normal communication state.

6. The method according to claim 5, wherein the method further comprises:
    transmitting log information of at least one of the first terminals which have no cable inserted to a remote management platform which is external to the immersion cooling tank via the second terminal of the management board and issuing an alarm of the at least one of the first terminals which have no cable inserted on site.

7. The method according to claim 1, wherein the method further comprises:
    determining that the management board is the master management board if the levels of at least two of the detected signals are low and the levels of at least one of the detected signals are high.

8. A management board of an immersion cooling tank applied on the immersion cooling tank, the immersion cooling tank comprising a plurality of power shelves and a plurality of management boards, each of the power shelves corresponding to one of the management boards, each of the management boards being configured to manage a plurality of operations of a plurality of power supply units in the corresponding power shelf, each of the management boards comprising at least two first terminals, each of the first terminals being configured to enable a communication between the management board and one other management board, the management boards comprising one or more master management boards and two or more slave management boards, each of the first terminals of each of the master management boards being configured to couple to one of the first terminals of one of the slave management boards, any one of the first terminals of any one of the master management boards being coupled to one corresponding of the first terminals of one corresponding of the slave management boards via an RJ45 connector when the any one of the first terminals of the any one of the master management boards is coupled to the corresponding one of the first terminals of the corresponding one of the slave management boards, the management board of the immersion cooling tank comprising:
    a storage device;
    at least one processor; and
    the storage device storing one or more programs, which when executed by the at least one processor, cause the at least one processor to:
    detect a signal of each of the first terminals of the management board;
    determine a first number of levels of the detected signals being high and a second number of the levels of the detected signal being low;
    determine whether the management board is the master management board or the slave management board according to the first number and the second number, wherein the management board is determined to be the master management board if the levels of all of the detected signals are low.

9. The management board of the immersion cooling tank according to claim 8, further causing the at least one processor to:
    detect a signal of a pin 2 of each of the first terminals of the management board to detect the signal of each of the first terminals of the management board, wherein, a high level signal is applied to the pin 2 of each of the first terminals of the management board via a pull-up resistor, and a low level signal is applied to a pin 6 of each of the first terminals of the management board via a pull-down resistor; the pin 2 of each of the first terminals of each of the management boards is coupled to the pin 6 of one of the first terminals of the other management board when each of the first terminals of the management board are coupled to the one of the first terminals of the other management board.

10. The management board of the immersion cooling tank according to claim 8, further causing the at least one processor to:
    obtain a plurality of operation data of the power supply units in the power shelves corresponding to the slave management boards coupled to the master management board from the slave management boards coupled to the master management board via an RS232 protocol, if the management board is the master management board;
    gather the operation data of the power supply units in the power shelves corresponding to the slave management boards and monitored operation data of the power supply units in the power shelf corresponding to the master management board.

11. The management board of the immersion cooling tank according to claim 8, further causing the at least one processor to:
    determine that the management board is the slave management board if the level of one of the detected signals is low and the levels of the other of the detected signals are high.

12. The management board of the immersion cooling tank according to claim 8, further causing the at least one processor to:
    detect a state of a second terminal of the management board if the levels of all of the detected signals are high;
    determine that the management board is the master management board if the state of the second terminal of the management board is in a normal communication state.

13. The management board of the immersion cooling tank according to claim 12, further causing the at least one processor to:
    transmit log information of at least one of the first terminals which have no cable inserted to a remote management platform which is external to the immersion cooling tank via the second terminal of the management board and issue an alarm of at least one of the first terminals which have no cable inserted on site.

14. The management board of the immersion cooling tank according to claim 8, further causing the at least one processor to:
    determine that the management board is the master management board if the levels of at least two of the detected signals are low and the levels of at least one of the detected signals are high.

15. A non-transitory storage medium storing a set of commands, the commands being configured to be executed by at least one processor of a management board of an immersion cooling tank, the management board being applied on the immersion cooling tank, the immersion cooling tank comprising a plurality of power shelves and a plurality of management boards, each of the power shelves corresponding to one of the management boards, each of the management boards being configured to manage a plurality of operations of a plurality of power supply units in the corresponding power shelf, each of the management boards comprising at least two first terminals, each of the first terminals being configured to enable a communication between the management board and one other management board, the management boards comprising one or more master management boards and two or more slave management boards, each of the first terminals of each of the master management boards being configured to couple to one of the first terminals of one of the slave management boards, any one of the first terminals of any one of the master management boards being coupled to corresponding one of the first terminals of corresponding one of the slave management boards via an RJ45 connector when the any one of the first terminals of the any one of the master management boards is coupled to the one corresponding of the first terminals of the one corresponding of the slave management boards, when the commands being executed by at least one processor of the management board of the immersion cooling tank, causing the at least one processor to:

detect a signal of each of the first terminals of the management board;

determine a first number of levels of the detected signals being high and a second number of the levels of the detected signals being low;

determine whether the management board is the master management board or the slave management board according to the first number and the second number, wherein the management board is determined to be the master management board if the levels of all of the detected signals are low.

16. The non-transitory storage medium according to claim 15, further causing the at least one processor to:

detect a signal of a pin 2 of each of the first terminals of the management board to detect the signal of each of the first terminals of the management board, wherein, a high level signal is applied to the pin 2 of each of the first terminals of the management board via a pull-up resistor, and a low level signal is applied to a pin 6 of each of the first terminals of the management board via a pull-down resistor; the pin 2 of each of the first terminals of each of the management boards is coupled to the pin 6 of one of the first terminals of the other management board when each of the first terminals of the management board are coupled to the one of the first terminals of the other management board.

17. The non-transitory storage medium according to claim 15, further causing the at least one processor to:

obtain a plurality of operation data of the power supply units in the power shelves corresponding to the slave management boards coupled to the master management board from the slave management boards coupled to the master management board via an RS232 protocol, if the management board is the master management board;

gather the operation data of the power supply units in the power shelves corresponding to the slave management boards and monitored operation data of the power supply units in the power shelf corresponding to the master management board.

18. The non-transitory storage medium according to claim 15, further causing the at least one processor to:

determine that the management board is the slave management board if the level of one of the detected signals is low and the levels of the other of the detected signals are high.

19. The non-transitory storage medium according to claim 15, further causing the at least one processor to:

detect a state of a second terminal of the management board if the levels of all of the detected signals are high;

determine that the management board is the master management board if the state of the second terminal of the management board is in a normal communication state.

20. The non-transitory storage medium according to claim 19, further causing the at least one processor to:

transmit log information of at least one of the first terminals which have no cable inserted to a remote management platform which is external to the immersion cooling tank via the second terminal of the management board and issue an alarm of the at least one of the first terminals which have no cable inserted on site.

* * * * *